(12) United States Patent
Kelly et al.

(10) Patent No.: US 8,144,716 B2
(45) Date of Patent: *Mar. 27, 2012

(54) METHOD AND SYSTEM FOR PROVIDING TELECOMMUNICATION SUBSCRIBER SERVICES WITHOUT PROVISIONING OR MAINTENANCE

(75) Inventors: Michael R. Kelly, Omaha, NE (US); Anders Askerup, Omaha, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/972,084

(22) Filed: Dec. 17, 2010

(65) Prior Publication Data

US 2011/0092216 A1 Apr. 21, 2011

Related U.S. Application Data

(63) Continuation of application No. 10/174,276, filed on Jun. 18, 2002, now Pat. No. 7,881,308.

(51) Int. Cl.
*H04L 12/28* (2006.01)
*H04L 12/56* (2006.01)

(52) U.S. Cl. ........ 370/401; 370/352; 370/353; 370/337; 370/328; 455/445

(58) Field of Classification Search ............... 370/401, 370/352, 353, 337, 328; 455/445, 433, 466, 455/461

See application file for complete search history.

(56) References Cited

U.S. PATENT DOCUMENTS

| | | | |
|---|---|---|---|
| 5,819,178 A | 10/1998 | Cropper | |
| 6,064,887 A * | 5/2000 | Kallioniemi et al. | 455/445 |
| 6,195,705 B1 | 2/2001 | Leung | |
| 6,366,777 B1 | 4/2002 | Uusitalo | |
| 6,400,701 B2 | 6/2002 | Lin et al. | |
| 6,515,997 B1 | 2/2003 | Feltner et al. | |
| 6,539,237 B1 | 3/2003 | Sayers et al. | |
| 6,662,017 B2 * | 12/2003 | McCann et al. | 455/461 |
| 6,745,041 B2 | 6/2004 | Allison et al. | |
| 6,993,038 B2 * | 1/2006 | McCann | 370/401 |
| 7,286,839 B2 * | 10/2007 | McCann et al. | 455/461 |
| 7,502,339 B1 * | 3/2009 | Pirkola et al. | 370/310 |
| 7,881,308 B2 * | 2/2011 | Kelly et al. | 370/401 |
| 2003/0227899 A1 * | 12/2003 | McCann | 370/349 |
| 2004/0005892 A1 * | 1/2004 | Mayer et al. | 455/432.1 |
| 2004/0082332 A1 * | 4/2004 | McCann et al. | 455/445 |

OTHER PUBLICATIONS

"The SS7 Signaling Connection Control Part Reply System," 12 p.; May 12, 2000. [Online] http://www.nettwerked.net/seep_relay.txt.
Kelly et al., Office Action dated Jul. 26, 2006, U.S. Appl. No. 10/174,276, filed Jun. 18, 2002.
Kelly et al., Response to Office Action Jul. 26, 2006, filed Oct. 10, 2006, U.S. Appl. No. 10/174,276, filed Jun. 18, 2002.
Kelly et al., Final Office Action dated Jan. 3, 2007, U.S. Appl. No. 10/174,276, filed Jun. 18, 2002.
Kelly et al., RCE and Preliminary Amendment filed Mar. 29, 2007, U.S.Appl. No. 10/174,276, filed Jun. 18, 2002.
Kelly et al., Office Action dated May 31, 2007, U.S. Appl. No. 10/174,276, filed Jun. 18, 2002.
Kelly et al., Response to Office Action dated May 31, 2007, filed Feb. 28, 2008, U.S. Appl. No. 10/174,276, filed Jun. 18, 2002.

(Continued)

*Primary Examiner* — Chuong T Ho

(57) ABSTRACT

An intelligent router takes the place of a conventional SCCP relay in a wireless network. The intelligent router automatically provisions and updates subscriber information in a network file.

18 Claims, 3 Drawing Sheets

OTHER PUBLICATIONS

Kelly et al., Office Action dated Nov. 28, 2007, U.S. Appl. No. 10/174,276, filed Jun. 18, 2002.
Kelly et al., Response to Office Action dated Nov. 28, 2007, filed Feb. 28, 2008, U.S. Appl. No. 10/174,276, filed Jun. 18, 2002.
Kelly et al., Office Action dated Jul. 21, 2008, U.S. Appl. No. 10/174,276, filed Jun. 18, 2002.
Kelly et al., Response to Office Action dated Jul. 21, 2008, filed Oct. 20, 2008, U.S. Appl. No. 10/174,276, filed Jun. 18, 2002.
Kelly et al., Office Action dated Jan. 23, 2009, U.S. Appl. No. 10/174,276, filed Jun. 18, 2002.
Kelly et al., Response to Office Action dated Jan. 23, 2009, filed Apr. 21, 2009, U.S. Appl. No. 10/174,276, filed Jun. 18, 2002.
Kelly et al., Office Action dated Aug. 20, 2009, U.S. Appl. No. 10/174,276, filed Jun. 18, 2002.
Kelly et al., Response to Office Action dated Aug. 20, 2008 filed Nov. 18, 2009, U.S. Appl. No. 10/174,276, filed Jun. 18, 2002.
Kelly et al., Final Office Action dated Feb. 22, 2010, U.S. Appl. No. 10/174,276, filed Jun. 18, 2002.
Kelly et al., Appeal Brief filed Jun. 21, 2010, U.S. Appl. No. 10/174,276, filed Jun. 18, 2002.
Kelly et al., Notice of Allowance dated Sep. 20, 2010, U.S. Appl. No. 10/174,276, filed Jun. 18, 2002.

* cited by examiner

METHOD AND SYSTEM FOR PROVIDING TELECOMMUNICATION SUBSCRIBER SERVICES WITHOUT PROVISIONING OR MAINTENANCE

CROSS-REFERENCE TO RELATED APPLICATIONS

This application claims priority to, and is a continuation of, U.S. application Ser. No. 10/174,276, filed Jun. 18, 2002 now U.S. Pat. No. 7,881,308, titled "Method And System For Providing Telecommunication Subscriber Services Without Provisioning Or Maintenance," incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention generally relates to a system for providing telecommunication services. More particularly, the present invention relates to a method and system for providing telecommunication subscriber routing services without provisioning or maintenance of subscriber routing information. Still more particularly, the invention relates to an intelligent router that provisions and updates a dialable number-to-home location register address translation file without human intervention.

2. Background Information

The present disclosure generally applies to wireless networks and, more particularly, to cellular telephone systems. One such system is referred to as the Global System for Mobile Communications ("GSM") which began in Europe and is now available, and growing, in the United States. Although the following discussions is provided in the context of GSM, it should be understood that the disclosure and the claims which follow should not be limited to GSM, unless otherwise specified.

A traditional GSM implementation is show in FIG. 1. A conventional telephone system 10 is shown as PSTN which stands for "Public Switched Telephone Network." The PSTN refers to the international telephone system. An exemplary telephone 12 is shown attached to, or part of, the PSTN 10. The GSM system shown in FIG. 1 also includes one or more switches 14 and 16. The switches generally communicate with the various subscribers and their cellular telephones, for example cell phone 18. The cell phones are generically referred to as mobile stations ("MS"). It should be understood that the MSs typically do not communicate directly with the switches, but instead communicate with cell towers which relay transmissions between the MSs and the switches. The cell towers have been omitted from FIG. 1 for sake of clarity.

Two numbers are associated with each MS 18. One number is the unique dialable, publicly known number (e.g., 123-456-7890) and is also referred to as the mobile subscriber integrated services digital network ("MSISDN"). The other number is also unique to the MS, but is non-dialable and is generally not known to the public and even the owner of the MS itself. This latter number is referred to as the international mobile subscriber identifier ("IMSI") number and identifies the MS device to the network. That is, the GSM network generally refers to each MS by its non-dialable IMSI number, and not its dialable MSISDN number.

The network in FIG. 1 also includes a home location register ("HLR") 20. The HLR is a database that contains semi-permanent mobile subscriber information for a wireless carrier's entire subscriber base. The information in the HLR for each subscriber includes the subscriber's IMSI and MSISDN numbers, service subscription information, location information, service restrictions and supplementary services information. The service subscription information specifies the features which the subscriber has in his or her subscription (e.g., call waiting, call forwarding, etc.).

The location information specifies the current location of the subscriber's MS 18. It is desirable for MSs 18 to have one dialable MSISDN number, although more than one is allowed, that can be dialed by anyone regardless of the current location of the MS. The GSM network provides this benefit. A subscriber turns on his or her MS 18 to register the device with the network. Information is passed between the MS 18 and the nearest switch that enables the switch to determine that an MS with a particular IMSI number is in that switch's coverage area. Location information pertaining to that MS is provided to the HLR 20 and the subscriber's HLR information is updated to reflect the current location of the subscriber's MS. Then, when another person dials the subscriber's MSIDN number (e.g., 123-456-7890), the home switch (i.e., the switch corresponding to the MSISDN's area code) contacts the HLR 20 and provides the called MSISDN number to the HLR. The Ella 20 maps the MSISDN number to the subscriber's non-dialable IMSI number and provides the subscriber MS's current location information to the switch at which the call originated. That switch then uses the location information to complete the call between the caller and the subscriber's MS.

As a GSM wireless carrier's subscriber base grows, it will eventually become necessary to add additional HLRs to the network. This requirement might be prompted by a service subscription record storage capacity issue, or perhaps a message processing performance issue. Also, it might be prompted by a need to increase the overall network reliability.

The traditional GSM embodiment shown in FIG. 1 works well until more than one HLR is included in the network. With multiple HLRs, additional logic is needed to determine which HLR corresponds to a given subscriber so that the subscriber's current location can be determined. Referring now to FIG. 2, another conventional embodiment of a GSM network is shown in which multiple HLRs are provided. Each HLR has a unique address which the system uses for communication with the HLRs. Each HLR 20 stores the location information discussed above for a plurality of subscribers. To complete a call to an MS 18, it must be determined or known which HLR contains the necessary location information regarding the target subscriber. To that end, the GSM configuration of FIG. 2 also includes a signaling connection control part ("SCCP") relay 30. The SCCP relay 30 includes MSISDN-to-HLR address translations. The function performed by the SCCP relay is to translate a subscriber's MSIDN number to an HLR address containing the information pertaining to that subscriber so that the subscriber's location information can be retrieved to complete the call as described above.

The SCCP relay 30 is generally a database containing the MSISDN-to-HLR address translations. Currently, this database is maintained and edited manually. That is, human intervention is required to enter new subscribers to the SCCP relay 30 (referred to as "provisioning"), as well as to change existing information (e.g., translations) contained in the relay. This process which requires human beings to continually update the SCCP relay database generally is satisfactory, but does have its disadvantages such as data entry errors that may occur due to human intervention, as well as the daily maintenance costs associated with the human intervention. Failure to maintain the accuracy of such information can translate into lost revenue due to the failure to locate and connect calls to subscribers that are not current between the HLRs and the SCCP relays. Accordingly, an improved mechanism is needed to address these concerns.

BRIEF SUMMARY OF THE PREFERRED EMBODIMENTS OF THE INVENTION

The problems noted above are solved in large part by an intelligent router that takes the place of the SCCP relay described above. Whereas the SCCP relay's translation information was manually provisioned and updated, in accordance with the preferred embodiment, the intelligent router automatically provisions and updates a translation file without human involvement.

In accordance with one embodiment of the invention, a router includes a microprocessor and a mass storage device coupled to the microprocessor. The mass storage device contains both a network entity file and a routing translation file. The network entity file contains addresses of entities accessible to the router and the translation file is used to store translations from a mobile station dialable number to an address of one of the entities. Upon receiving information regarding a call to a subscriber for which a translation is not present in the translation table, the microprocessor automatically (i.e., without human intervention) updates the translation table to provide a translation for the subscriber.

In accordance with another aspect of the invention, a wireless network provides telecommunication service to a plurality of mobile stations. The network comprises a first router, a plurality of second routers coupled to the first router and a plurality of network entities coupled to the second routers. The first router has access to a network entity file and a routing translation file. The network entity file contains addresses of the second routers and the translation file is used to store translations from a mobile station dialable number to an address of one of the network entities which contains location information pertaining to the mobile station. Further, upon receiving information regarding a call to a subscriber for which a translation is not present in the translation table, the first router automatically updates, without human intervention, the translation table to provide a translation for the subscriber.

By automatically updating the translation information, the potential for data entry errors are eliminated and a more robust, less costly network is provided. These and other advantages will become apparent upon reviewing the following disclosure.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. To the extent that any term is not specially defined in this specification, the intent is that the term is to be given its plain and ordinary meaning.

DETAILED DESCRIPTION OF THE PREFERRED EMBODIMENTS

In accordance with a preferred embodiment of the invention, an intelligent router is provided in place of the SCCP relay described above. The SCCP relay was manually updated. The intelligent router described above creates and updates its routing information automatically (i.e., without human intervention).

Figure 3:
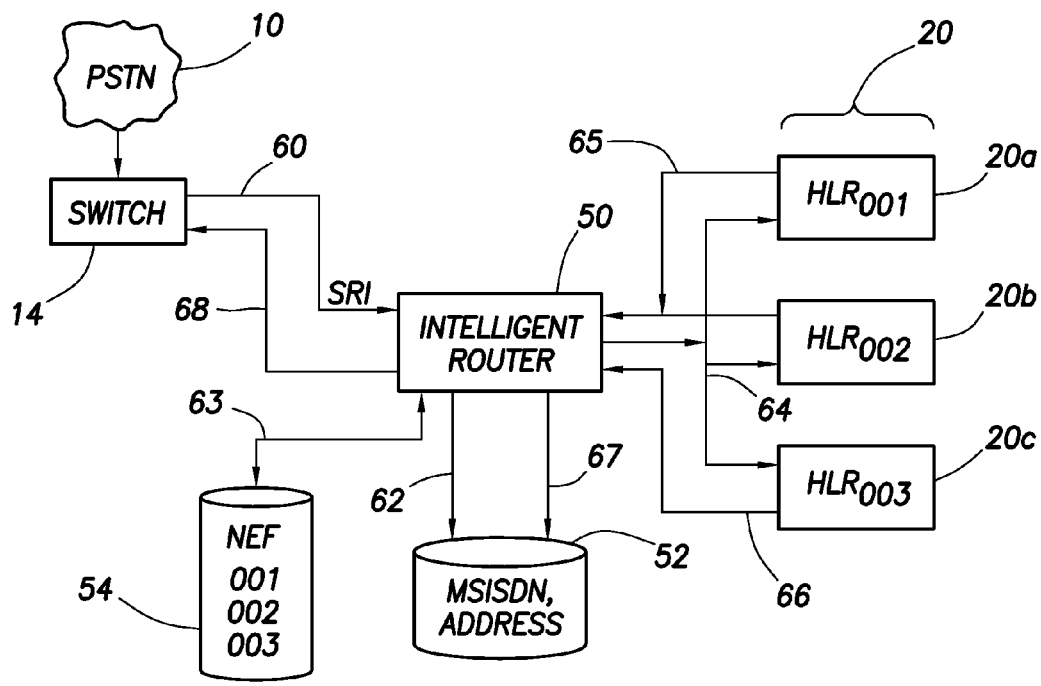
FIG. 3 shows a preferred embodiment of a wireless networking including an intelligent router which automatically updates routing translation information.

Referring now to FIG. 3, a wireless network (e.g., GSM) includes one or more switches 14, multiple HLRs 20 and an intelligent router 50 coupled to a conventional telephone system 10 ("PSTN"). The intelligent router 50 has access to at least two files 52 and 54. File 52 contains an MSISDN-to-address translation entry for each provisioned subscriber in the network. Each entry includes the subscriber's dialable MSISDN number and the address of the HLR corresponding to that subscriber. Whereas this type of information had to be manually created and updated in the SCCP relays of conventional wireless networks, file 52 is updated automatically by the intelligent router 50 in the embodiment shown in FIG. 3. File 54 is the network entity file ("NEF") and preferably includes the address of each HLR 20 or other routable entity in the network. In the exemplary network configuration of FIG. 1, three HLRs are shown—HLR 20a, 20b, and 20c. These three HLRs have addresses 001, 002, and 003, respectively. The HLR addresses 001, 002, and 003 are stored in the NEF file 54 as shown.

When a person first subscribes to the wireless service, the intelligent router is unaware of that subscriber. More particularly, the MSISDN-to-address translation file 52 does not have an entry corresponding to that subscriber. In conventional networks, a human being would have to manually create an entry for the subscriber in the SCCP relay and enter the HLR address corresponding to that subscriber's MSISDN. In the preferred embodiment of FIG. 3, the MSISDN-to-address translation entry for the new subscriber is created automatically as described above.

Figure 1:
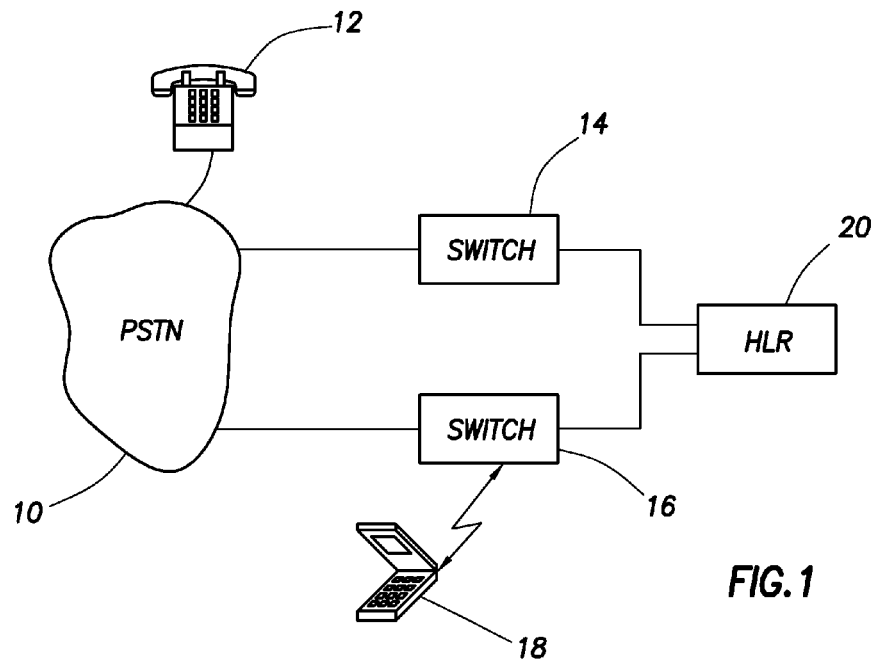
FIG. 1 shows a conventional wireless network having a single home location register ("HLR")
Figure 2:
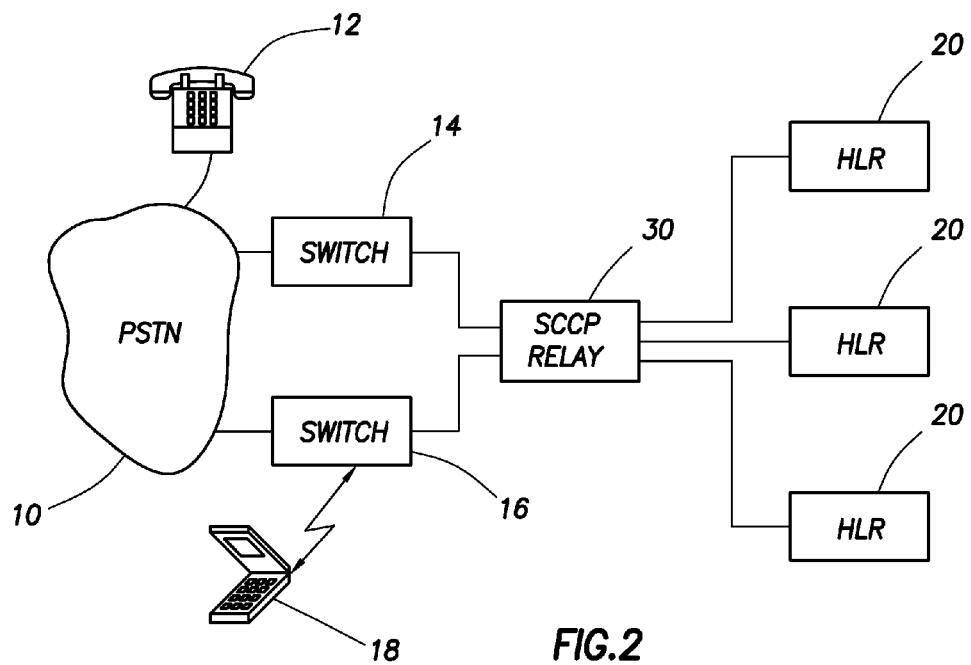
FIG. 2 shows a conventional wireless network having multiple HLRs.

The process of creating a new MSISDN-to-address translation entry in file 52 and then using that information is depicted in FIG. 1 via a series of messages labeled as 60-68. FIG. 3 depicts how a subscriber becomes provisioned in the file 52 for the first time. Initially, someone calls the new, non-provisioned subscriber's dialable MSISDN number (e.g., 123-456-7890). As a result, the switch 14 transmits a send routing information ("SRI") request message 60 to the intelligent router 50. The SRI request message is a well known message construct in accordance with the GSM standard and generally includes the target MSISDN number and requests location information pertaining to the target subscriber in return. Next, the intelligent router 50 determines whether its MSISDN-to-address translation file 52 includes an entry corresponding to the MSISDN number in the SRI message 60 by querying its file 52 (step 62). In the current example, the MSISDN-to-address translation file 52 will not have an entry for the target MSISDN number. The result of the file 52 query informs the intelligent router that the desired information is not present in the file and thus the intelligent router will have to determine which HLR 20 contains the location pertaining to the target subscriber.

Referring still to FIG. 3, the intelligent router 50 next accesses the NEF file 54 in step 63 to ascertain the addresses of the HLRs 20 in which the requested location information could be stored. Armed with the HLR addresses, the intelligent router 50 forwards the SRI message, containing the target MSISDN number, to each of the HLRs 20a-20c (step 64). Each HLR 20a-20c responds with an indication as to whether it contains the target subscriber. Assuming that HLRs 20a and 20b do not contain information regarding the desired subscriber, but HLR 20c does contain the desired information, HLRs 20a and 20b preferably respond (step 65) with a suitable error message indicating a failure to find the desired subscriber in those HLRs. HLR 20c, however, responds (step 66) with a send routing information ACK message which is a well-known GSM message construct. The send routing information ACK message includes the location of the switch 14 to which the subscriber is currently registered and any other desired information such as restriction information.

The intelligent router 50 preferably receives the send routing information ACK message and, in step 67, updates its MSISDN-to-address translation file 52 to include an entry for the subscriber. The newly added entry will include the MSISDN pertaining to that subscriber along with the address of the subscriber's HLR 20. This address can be either the IMSI associated with the MSISDN or as described in the example described herein with regard to FIG. 3, the address is 003 corresponding to HLR 20c. Finally, in step 68, the desired location information is provided back to the originating switch 14 which then completes the call.

The process described with respect to FIG. 3 results in the intelligent router 50 automatically creating an entry for all new subscribers once the first call to that new, but non-provisioned in the intelligent router 50, subscriber is made. From that point on, the intelligent router has access to the HLR address for that subscriber in its file 52 so that the query and response steps 64-66 are not necessary, unless the subscriber is migrated to another HLR, which will then automatically trigger the query steps again.

Figure 4:
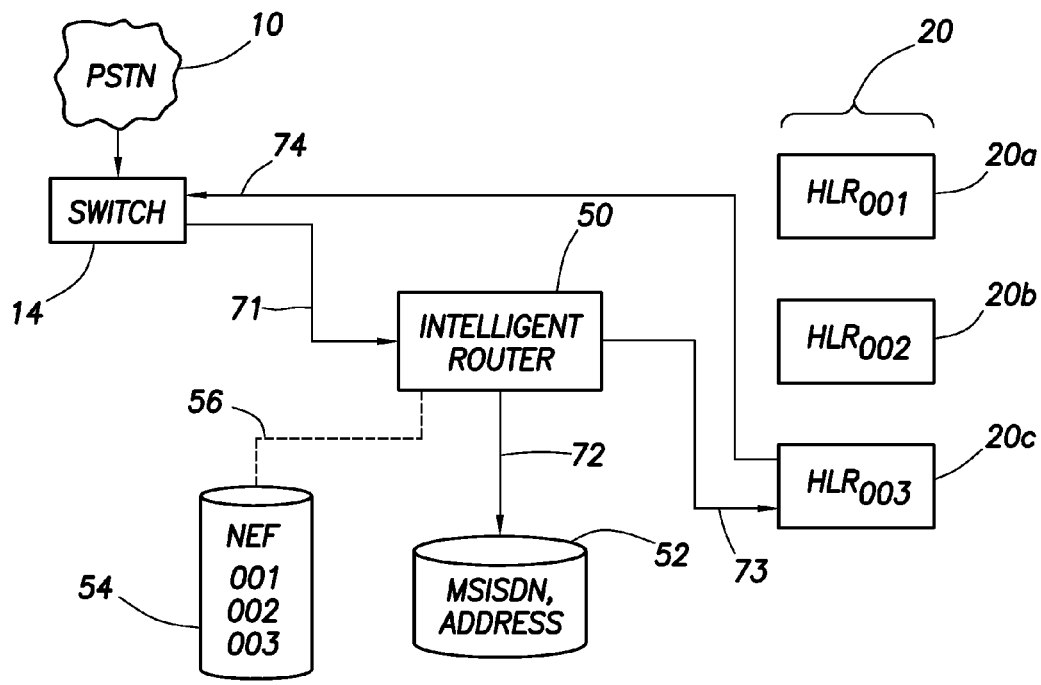
FIG. 4 shows another aspect of the use of the network configuration of FIG. 3.

FIG. 4 illustrates the process using the intelligent router 50 when a call is placed to a subscriber that has already been provisioned in the MSISDN-to-address translation file 52 in accordance with automatic process described above. The switch 14 sends a send routing information message 71 to the intelligent router 50. The intelligent router in step 72 queries its file 52 to determine if the subscriber is present in the file. That being the case in the example of FIG. 4, the intelligent router will then access the subscriber's HLR address from the file 52 and, in step 73, forwards the send routing information request to the correct HLR (in this case HLR 20c). That HLR retrieves the desired information and provides a send routing information return result message 74 back to the originating switch 14. The dashed line 56 connecting the NEF file 54 to the intelligent router 50 indicates the that NEF file 54 is not queried in this process. A second configurable alternative is to allow all SRI ACKs to pass back through the Intelligent Router to provide real time clean up routines, if determined necessary.

Figure 5:
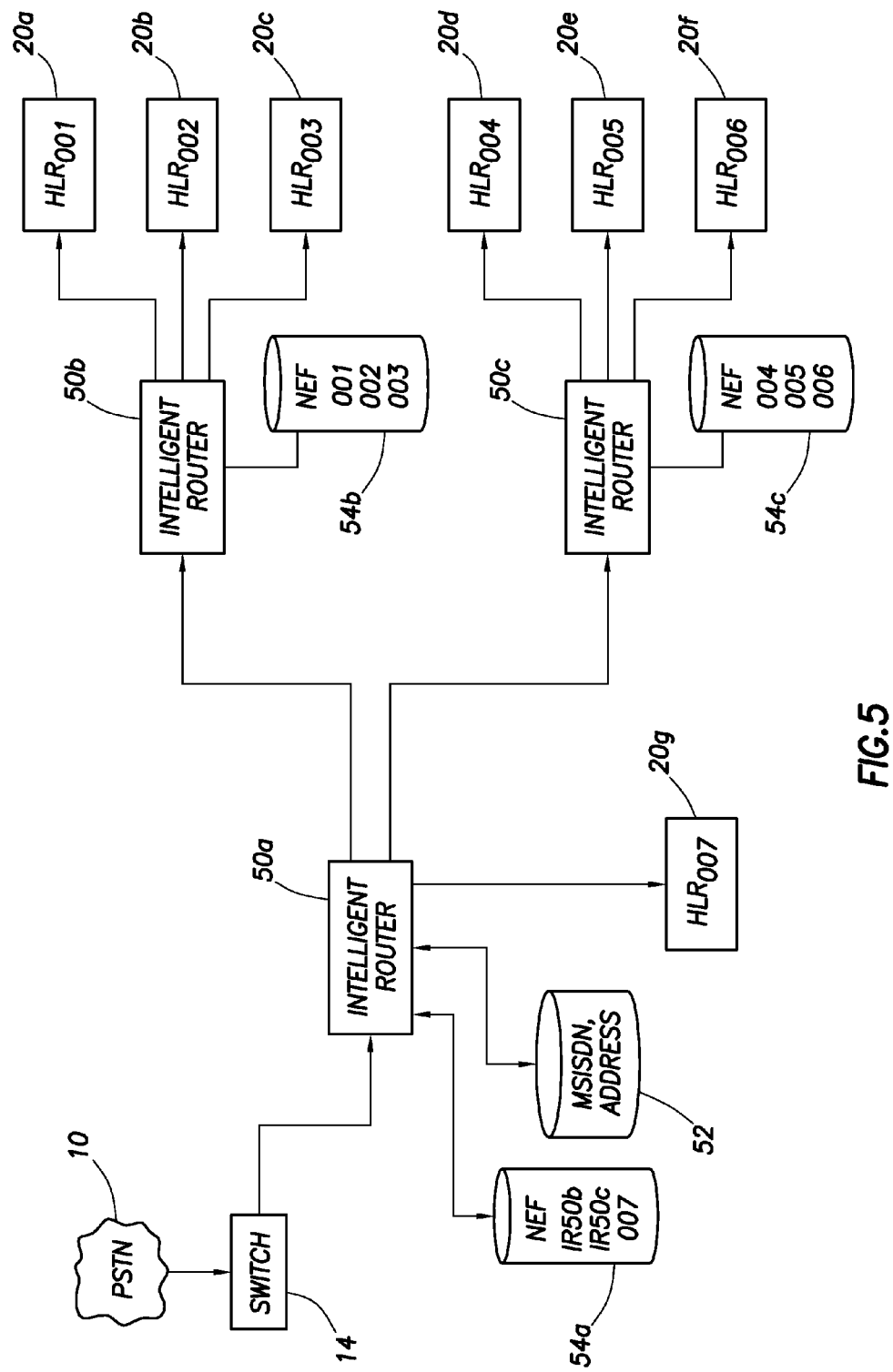
FIG. 5 shows an alternative embodiment which includes a plurality of intelligent routers.

FIG. 5 illustrates an alternative embodiment of the invention which includes a plurality of intelligent routers. FIG. 5 shows three intelligent routers 50a, 50b and 50c. Each intelligent router 50a-50c may couple to one or more HLRs as well as another intelligent router as desired. As shown in FIG. 5, intelligent router 50a couples to HLR 20g as well as intelligent routers 50b and 50c. Intelligent router 50b couples to HLRs 20a-20c, while intelligent router 50c couples to HLRs 20d-20f. The HLRs 20a-20g have address 001-007, respectively. The multiple intelligent router configuration shown in FIG. 5 is exemplary only of the many ways in which multiple intelligent routers can be configured, and all such configurations should be considered within the scope of this disclosure.

The NEF file 54a is accessible by intelligent router 50a. Similar NEF files 54b and 54c are made accessible to intelligent routers 50b and 50c, respectively. The NEF file 54a includes address for all of the network entities to which intelligent router 50a has access, namely, intelligent router 50b, intelligent router 50c and HLR address 007. NEF files 54b and 54c include addresses for their associated network entities, namely HLRs 20a-20c (NEF 54b) and 20d-20g (NEF 54c).

Any send routing information messages provided to intelligent router 50a are routed either directly to HLR 20g if NEF file 54a indicates that's where the target subscriber is located, or else to intelligent routers 50b and 50c. Intelligent routers 50b, 50c further forward the message on to their subsidiary HLRs in accordance with their respective NEF files 54b, 54c. Response information is percolated back through the network to the intelligent router 50a and to the originating switch 14, in a manner similar to that described above. Identical query capabilities can occur between each of the Intelligent routers, which allows for each IR to play a priming role. Each intelligent router may have its own MSISDN-to-address translation file 52, as described above, or only the primary intelligent router 50a may have a translation file 52.

An additional feature of the preferred embodiments includes a mechanism whereby the translation files 52 are automatically cleaned up. This can occur in a configurable pacing, batch mode whereby the network takes each entry in the translation file 52 and queries the HLR associated with that entry to verify that the translation entry is still accurate. This will permit translation file entries to be deleted automatically as subscribers are removed by the carrier or as a subscriber's location and service information is relocated from one HLR to another. This clean-up routine can occur at any desired time and in any desired mode. Preferably, the clean-up routine occurs at night or on weekends when network traffic is reduced. Also, the clean-up routine preferably runs in a background mode to permit the network to remain up and running while the translation file is being verified and updated.

A Table Initializer is also identified as a subcomponent of this invention to provide initial population of MSISDNs to avoid a performance degradation factor that could occur if the Intelligent Router is installed in an existing network and activated for the first time. The Initializer will accept as input information pertaining to MSISDNs and their current addresses.

The intelligent router 50 above can be any suitable electronic device that performs the functions described above. For example, the router 50 may generally comprise a computer containing one or more microprocessors, memory, mass storage devices and communication ports for communication with other equipment as shown in FIGS. 3-5. The translation files 52 and NEF files 54 may be stored in a mass storage device included as part of the router 50 or in a separate device to which the router has access.

The preferred embodiments of the invention described herein provide a mechanism whereby network entities are queried for the presence of desired location information of a desired MS rather than a centralized file having to be manually updated as in conventional systems. Accordingly, the preferred approach advantageously provides a mechanism whereby the MSISDN to HLR address translations are automatically created without human intervention and the problems associated therewith. This provides increased data integrity and a lower cost of ownership.

The above discussion is meant to be illustrative of the principles and various embodiments of the present invention. Numerous variations and modifications will become apparent to those skilled in the art once the above disclosure is fully appreciated. For example, although a GSM implementation has been shown and discussed, the above description and claims which follow are intended to encompass the principle of automatically updating and provisioning routing information in a network by, when necessary, querying the network entities for the presence of the relevant information. This disclosure and claims should not be limited to any particular embodiment, such as GSM, ANSI, ITU or IETF. Further, the particular implementations shown in the figures may be modified in a number of different ways without departing from the principles and scope of this disclosure. Components can be added or removed from the circuits and different circuits altogether that provide the same benefits and functionality can be used. It is intended that the following claims be interpreted to embrace all such variations and modifications.

What is claimed is:

1. A router configured for use in a wireless network providing telecommunication services to mobile stations operated by subscribers to said telecommunication services, said router comprising:
   a microprocessor; and
   a mass storage device coupled to said microprocessor, said mass storage device containing a network entity file and a routing translation file, said network entity file contains addresses of entities accessible to said router and said translation file is used to store translations from a mobile switching equipment dialable number associated with subscriber's mobile station to an address of one of said entities;
   wherein, upon receiving information regarding a call to a subscriber for which a translation is not present in the translation table, said microprocessor automatically updates, without human intervention, said translation table to provide a translation for the subscriber; and
   wherein said router implements a batch mode whereby, for each entry in the routing translation file, the network entity associated with that entry is queried to verify accuracy of that entry's translation.

2. The router of claim 1 wherein said microprocessor accesses said network entity file to retrieve said addresses and broadcasts a message to said entities to determine which entity contains location information pertaining to said subscriber.

3. The router of claim 2 wherein said router receives a response from the entity to which said message was broadcast that contains said location information pertaining to said subscriber and said microprocessor stores a translation in said translation file, said translation includes the address of the entity containing the location information.

4. The router of claim 2 wherein said message comprises a send routing information message.

5. The router of claim 3 wherein said response comprises a send routing information return request message.

6. The router of claim 1 wherein said entities comprise home location registers, each register containing a plurality of entries, one or more entries per subscriber, and each entry including location information pertaining to a subscriber, said location information indicating a network switch to which the subscriber is currently registered.

7. A method of managing routing information in a wireless network, comprising:
   (a) receiving a request for routing information for a subscriber's mobile Switching equipment ("MS");
   (b) determining whether a translation exists in a translation file for the MS, the translation translating a dialable number associated with the MS to a network entity containing translations of dialable numbers to non-dialable numbers to the MS's as well as location information as to the MS's current location; and
   (c) if no translation currently exists in the translation file, sending messages to a plurality of network entities to determine which of the entities contains the desired current location information for the MS; and
   (d) performing a batch mode whereby, for each translation in the translation file, a corresponding network entity is queried to verify accuracy of that entry's translation.

8. The method of claim 7 wherein the network entities comprise home location registers.

9. The method of claim 7 further receiving a message from the network entity which contains the desired current location information for the MS.

10. The method of claim 9 further including updating the translation file to include a translation for the MS.

11. The method of claim 7 wherein (c) includes retrieving addresses corresponding to the plurality of network entities before sending the messages.

12. The method of claim 7 wherein said network entities in (c) include at least one home location register and at least one router.

13. A wireless network providing telecommunication service to a plurality of mobile switching equipment, comprising:
   a first router;
   a plurality of second routers coupled to said first router; and
   a plurality of network entities coupled to said second routers;
   wherein the first router has access to a network entity file and a routing translation file, said network entity file contains addresses of said second routers and said translation file is used to store translations from a mobile switching equipment dialable number to an address of one of said network entities which contains location information pertaining to the mobile switching equipment, at least one network entity also comprising translations from dialable numbers associated with a mobile station to a non-dialable number associated with said mobile station; and
   further wherein, upon receiving information regarding a call to a subscriber for which a translation is not present in the translation table, said first router automatically updates, without human intervention, said translation table to provide a translation for the subscriber; and wherein at least one of routers performs a batch mode in which, for each entry in the routing translation file, a corresponding network entity is queried to verify accuracy of that entry's translation.

14. The network of claim 13 wherein said first router accesses said network entity file to retrieve said addresses and broadcasts a message to said second routers to determine which of said second routers can provide the location information pertaining to said subscriber.

15. The network of claim 14 wherein said first router receives a response from the second router that can provide the location information pertaining to said subscriber and said first router stores a translation in the translation file, the translation includes the address of the network entity containing the location information.

16. The network of claim 14 wherein said message comprises a send routing information message.

17. The network of claim 15 wherein said response comprises a send routing information return request message.

18. The network of claim 13 wherein said network entities comprise home location registers, each register containing a plurality of entries, one entry per subscriber, and each entry including location information pertaining to a subscriber, said location information indicating a network switch to which the subscriber is currently registered.

* * * * *